A. JACOBSON.
COAGULANT FOR WATER PURIFICATION AND PROCESS FOR MAKING SAME.
APPLICATION FILED APR. 27, 1914.
1,137,005.
Patented Apr. 27, 1915.
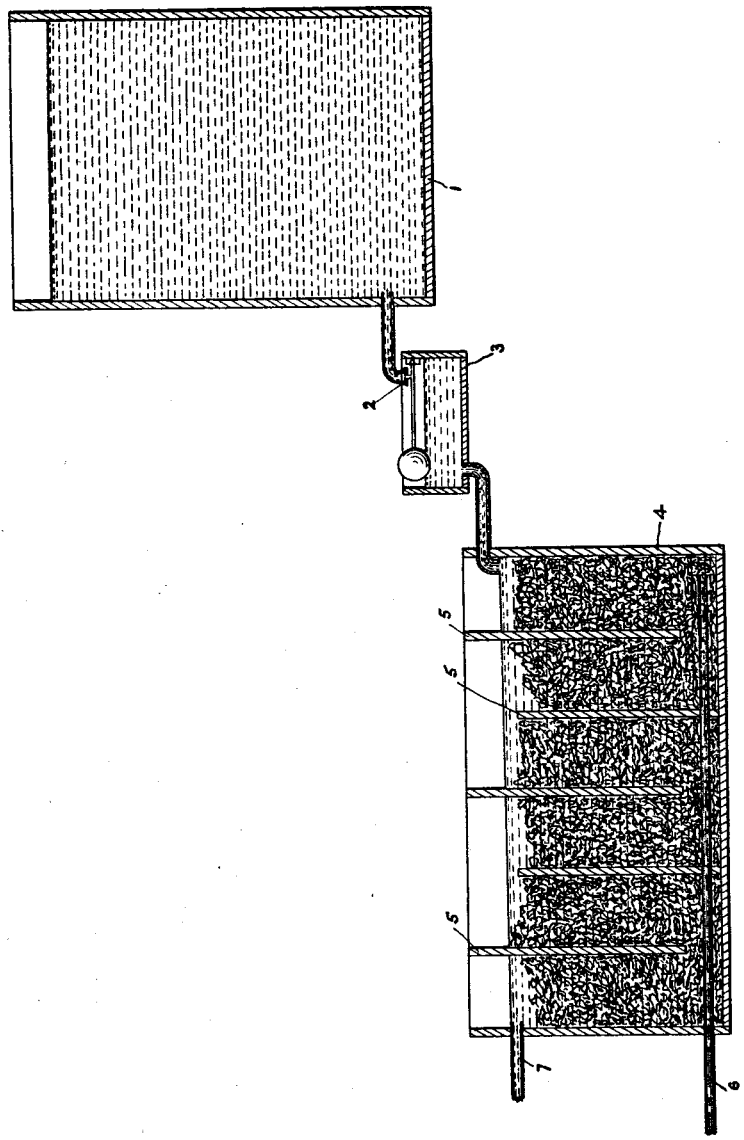
Andrew Jacobson, Inventor.
Witnesses:
By David O. Barnell,
Attorney.

UNITED STATES PATENT OFFICE.

ANDREW JACOBSON, OF COUNCIL BLUFFS, IOWA.

COAGULANT FOR WATER PURIFICATION AND PROCESS FOR MAKING SAME.

1,137,005. Specification of Letters Patent. Patented Apr. 27, 1915.

Application filed April 27, 1914. Serial No. 834,855.

*To all whom it may concern:*

Be it known that I, ANDREW JACOBSON, a citizen of the United States, and a resident of Council Bluffs, in the county of Pottawattamie and State of Iowa, have invented certain new and useful Improvements in Coagulants for Water Purification and Processes for Making Same, of which the following is a specification.

My invention relates to the art of water purification and especially to systems of purification involving the use of coagulants.

It is the object of my invention to provide a coagulant that may be economically employed in such systems or methods of water purification, and to provide a simple and commercially practicable process of preparing such coagulant.

In the accompanying drawing I have illustrated diagrammatically suitable apparatus for carrying out my invention.

Systems of water purification by coagulation may be defined briefly as systems wherein there is introduced into the water to be purified certain soluble metal salts (designated as coagulants) capable of reacting with alkaline materials contained naturally in the water or supplied thereto artificially; the reaction of the coagulant and alkali producing insoluble flocculent or gelatinous precipitates consisting of hydrates of the metal base or bases present in the coagulant; said precipitates serving to agglomerate or agglutinate the suspended impurities contained in the water; and the precipitate containing said impurities being subsequently removed from the water by sedimentation or filtration, or, more frequently, by both.

The efficiency of any particular substance as a coagulant is, of course, proportional to the quantity of the precipitant hydrate that can be formed thereby, and the quantity of such hydrate is proportional to the quantity of the metal base contained in the coagulant. The metal salts usually employed as coagulants consist of a metal combined chemically with an acid radical, and the cost of the metal constituent of the material is usually very low as compared with that of the acid constituent of the material. In consequence of this, it will be apparent that, in the preparation of coagulants, if the amount of metal therein can be increased without a proportionate increase in the acid constituent of the material, the effectiveness of the material as a coagulant will be increased without a corresponding increase in the cost of the material.

With the foregoing considerations in view, my invention may be regarded as a means of increasing the amount of the metallic constituents of a coagulant without porportionally increasing the amount of the acid constituents thereof; and the method of practising the invention may be stated as subjecting a metal to the action of a soluble salt of another metal to produce a corresponding salt of the first metal together with a soluble basic salt of the second metal.

The invention will be better understood by considering a specific application of it, rather than the foregoing general statement thereof.

One of the materials most commonly used as a coagulant is sulfate of aluminium, of which the chemical composition is expressed by the formula, $Al_2(SO_4)_3$. A solution of aluminium sulfate reacts acid and, like free acid, will dissolve certain other metals, such as iron, if brought into contact therewith at a suitable temperature. Under the conditions stated, a part of the acid constituent of the aluminium sulfate combines with the other metal to form a sulfate thereof, while the aluminium sulfate is reduced or decomposed to form a basic sulfate having the formula, $Al_2(OH)_2(SO_4)_2$. The reaction of aluminium sulfate with metallic iron may be expressed as follows:

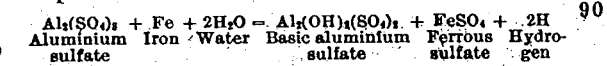

$Al_2(SO_4)_3$ + Fe + $2H_2O$ = $Al_2(OH)_2(SO_4)_2$ + $FeSO_4$ + 2H
Aluminium   Iron   Water   Basic aluminium   Ferrous   Hydro-
sulfate                          sulfate      sulfate    gen If the materials remain in contact for a sufficient time and there is an excess of iron present, the reaction will continue until the greater part of the acid originally combined with the aluminium has combined with the iron to form ferrous sulfate; but in this event there would be formed an insoluble compound of the aluminium which would not be available for use as a coagulant. Hence it is desirable to control the reaction so that it will conform substantially to the formula given above, wherein all of the aluminium remains in a soluble compound, and wherein the resultant amounts of aluminium and iron in solution are approximately equal, the exact ratio being $\frac{Al}{Fe} = .97$.

The rate at which the reaction proceeds is dependent upon the strength or density of the solution, the temperature, and the duration of contact with the metallic iron. These factors are all controllable and, consequently, the extent to which the reaction is carried may be readily controlled.

In practice the operation would be carried out as follows: A solution of aluminium sulfate of a definite strength, preferably a 5% to 10% solution, is stored in a tank or suitable receptacle 1 having a capacity sufficient for a day's supply. From said tank the solution is drawn off through a constant-flow device, such as a float-controlled valve 2 admitting the solution to a pan 3 so as to maintain a constant level of the liquid in the pan. From the pan 3 the solution is discharged into the reaction-tank 4 in which there is placed a quantitiy of comminuted iron, such as scrap iron borings, chips or filings. The reaction-tank shown in the drawing has a number of baffle-walls 5 so as to direct the solution with substantial uniformity throughout the mass of iron. There is shown also a perforate steam-pipe 6 disposed at the bottom of the tank, and through which steam may be admitted thereto so as to heat the materials to the desired temperature which, under average conditions, would be 100 to 120 degrees Fahrenheit. From the reaction-tank the solution, containing iron sulfate and basic aluminium sulfate, is discharged through a pipe 7 to be conveyed to and mixed in suitable proportions with the water to be purified by the coagulant. With the apparatus shown the process is continuous and the solution flows through the apparatus by gravity.

In order to compare the efficiency of the coagulant provided by my invention with that of the ordinary coagulant with which the process is commenced, it is necessary to consider the reactions occurring when the coagulant is added to the water to be purified. It is understood, of course, that the water must contain a suitable alkaline material capable of reacting with the coagulant, and where such an alkali is not normally present in the water it is supplied thereto artificially. A material commonly used for this purpose is lime or lime water, containing calcium hydrate, $Ca(OH)_2$. Assuming, for simplicity, that calcium hydrate is the only active alkali present, the reaction occurring upon the addition of aluminium sulfate as a coagulant would be expressed by the following:

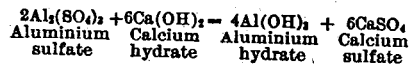

Starting with the same amount of aluminium sulfate, but proceeding in accordance with my invention, the reaction of the alkali and the coagulant would be expressed as follows:

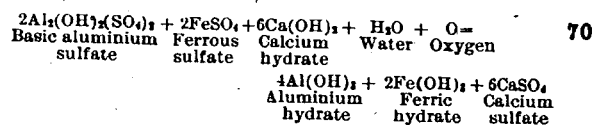

Considering the atomic weight of aluminium as 27, of oxygen as 16, of hydrogen as 1 and of iron as 56, and computing the molecular weights of the precipitated hydrates in the reactions expressed by the foregoing formulas, it will be seen that the efficiency of the coagulant provided by my invention, as compared with that of the aluminium sulfate alone, is 526:312. In other words, starting with a quantity of aluminium sulfate sufficient to produce, when used alone or directly, 312 pounds of coagulant precipitate, I am able to produce by the use of my process 526 pounds of coagulant precipitate (or 312 pounds of aluminium hydrate plus 214 pounds of ferric hydrate); and the cost of obtaining this additional effect is merely that of the scrap-iron dissolved and of the steam used in heating the materials to the desired temperature.

Now, having described my invention, what I claim and desire to secure by Letters Patent is:

1. A coagulant for water purification, consisting of iron sulfate and soluble basic sulfate of aluminium.

2. A coagulant for water purification, consisting of ferrous sulfate and basic sulfate of aluminium having the composition, $Al_2(OH)_2(SO_4)_2$.

3. A coagulant for water purification, consisting of a salt of one metal and a soluble basic salt of another metal, the first-named metal being one capable of displacing the second-named metal from its combination with the acid radical of the salt.

4. A coagulant for water purification, consisting of a sulfate of one metal and a soluble basic sulfate of another metal, the first-named metal being one capable of displacing the second-named metal from its combination with the sulfuric acid radical, $SO_4$.

5. The process of making coagulant for water purification, consisting in passing an aqueous solution of sulfate of aluminium over metallic iron, so that a part of the iron is dissolved to form iron sulfate, and the sulfate of aluminium is reduced to a soluble basic sulfate of aluminium.

6. The process of making a coagulant for water purification, consisting in forming an aqueous solution of sulfate of aluminium, passing said solution through a vessel containing metallic iron, and controlling the temperature and duration of contact of the solution with the iron so that not more than enough of the iron will be dissolved to reduce the sulfate of aluminium to a soluble basic sulfate of aluminium.

7. The process of making a coagulant for water purification, consisting in forming an aqueous solution of sulfate of aluminium, passing said solution through a vessel containing comminuted metallic iron, and controlling the temperature and duration of contact of the solution with the iron so that enough of the iron will be dissolved to reduce substantially all of the sulfate of aluminium to a soluble basic sulfate of aluminium.

8. The process of making a coagulant for water purification, consisting in forming an aqueous solution of a salt of one metal, placing said solution in contact with another metal capable of displacing the first metal from its combination with the acid radical of the salt, and controlling the reaction so that only enough of the second metal will be dissolved to reduce the salt of the first-named metal to a soluble basic salt of the same.

9. The process of making a coagulant for water purification, consisting in forming an aqueous solution of a sulfate of one metal, placing said solution in contact with another metal capable of displacing the first metal from its combinations with the sulfuric acid radical, $SO_4$, and controlling the temperature and duration of contact of the solution with the metal so that only enough of said metal will be dissolved to reduce the sulfate of the first metal to a soluble basic sulfate of the same.

10. The process of making a coagulant for water purification, consisting in forming an aqueous solution of sulfate of aluminium, placing said solution in contact with a metal capable of displacing the aluminium from its combinations with the sulfuric acid radical, $SO_4$, and controlling the reaction of said solution with said metal so that a sufficient quantity of a sulfate of said metal will be formed to result in the reduction of the sulfate of aluminium to a soluble basic sulfate of the same.

In testimony whereof I have hereunto subscribed my name in the presence of two witnesses.

ANDREW JACOBSON.

Witnesses:
JOSEPH PAPP, Jr.,
D. O. BARNELL.